United States Patent [19]

Pyles et al.

[11] 4,286,290

[45] Aug. 25, 1981

[54] FAST RECOVERY SQUELCH CIRCUIT FOR A VIDEO DISC PLAYER

[75] Inventors: Gerald D. Pyles, Danville; James A. Wilber; Todd J. Christopher, both of Indianapolis, all of Ind.

[73] Assignee: RCA Corporation, New York, N.Y.

[21] Appl. No.: 68,015

[22] Filed: Aug. 20, 1979

[51] Int. Cl.$^3$ ............................................. H04N 5/76
[52] U.S. Cl. .................................... 358/128.5; 369/43
[58] Field of Search ................. 358/4, 8, 128.5, 128.6; 360/36, 38; 179/100.1 G, 100.1 S, 100.3 V

[56] References Cited

U.S. PATENT DOCUMENTS

| | | | |
|---|---|---|---|
| 3,864,733 | 2/1975 | Boltz, Jr. | 360/38 X |
| 3,965,482 | 6/1976 | Burrus | 358/128.6 |
| 3,989,893 | 11/1976 | Eisema | 360/38 |
| 4,017,677 | 4/1977 | Baker | 358/127 |
| 4,017,678 | 4/1977 | Baker | 358/128.5 |
| 4,119,812 | 10/1978 | Fox | 360/38 X |

Primary Examiner—Bernard Konick
Assistant Examiner—Donald McElheny, Jr.
Attorney, Agent, or Firm—E. M. Whitacre; J. S. Tripoli; R. G. Coalter

[57] ABSTRACT

A squelch circuit responsive to a squelch signal mutes audio and video circuits in a video disc player, preconditions a video signal correction servo system to the center of its control range and inhibits a defect correction circuit. A squelch memory, set by the simultaneous occurrence of the squelch signal and a loss of carrier signal derived from the output of the player pickup transducer, maintains the muting, preconditioning and inhibiting functions. When the squelch signal terminates the squelch memory is reset upon subsequent termination of the loss of carrier signal whereby the audio and video circuits are immediately unmuted, stabilization is rapidly established by the preconditioned video signal correction servo system and the defect correction circuit is primed.

11 Claims, 4 Drawing Figures

FAST RECOVERY SQUELCH CIRCUIT FOR A VIDEO DISC PLAYER

This invention relates to squelch circuits and particularly to squelch circuits for use in video disc players of the kind including video signal correction servo systems.

Video disc players typically include some form of video signal correction servo system. For example, U.S. Pat. No. 3,965,482 entitled "Velocity Correction Circuit For Video Discs" issued to T. W. Burrus, June 22, 1976, discloses a video disc player which includes a video signal correction servo system for supplying signals to a tangential velocity correction transducer coupled to the player pickup stylus for minimizing turntable-stylus relative velocity errors thereby minimizing frequency errors in the recovered video signal. As another example, U.S. Pat. No. 3,996,606 entitled "Comb Filter For Video Processing" which issued to D. H. Pritchard, Dec. 7, 1976, discloses a video disc player including a video signal correction servo system which supplies signals to control the center frequency of a video signal comb filter circuit in the player to cause the center frequency of the filter to vary in consonance with frequency errors in the recovered video signal thereby maximizing filtering efficiency. As a further example, U.S. Pat. No. 3,872,498 entitled "Color Information Translating Systems" issued to D. H. Pritchard on Mar. 18, 1975, discloses a video disc player including a video signal correction servo system which provides transcoding (up-conversion) of video signals from a "burried subcarrier" format to an NTSC format.

One problem common to the three different video signal correction servo systems mentioned above is that each requires a period of time to stabilize after initiation of a play operation in the player. During this stabilization period the picture produced by the player may have a poor signal to noise ratio or the color reproduction may be poor or the display may have other objectionable characteristics. To avoid this, A. L. Baker proposed in U.S. Pat. No. 4,017,677 entitled "Squelch Circuit For A Video Record Player" which issued Apr. 12, 1977, that the player be equipped with a slow-release squelch circuit. Specifically, Baker's solution to the problem of poor picture quality during the servo system stabilization time was to add a delay circuit to the player squelch system which maintained the player audio and video circuits in a squelched condition for a period of time of sufficient length (e.g. one second) after initiation of a play operation to assure that the video signal correction servo had stabilized. Baker, in other words, proposed compromising the squelch system recovery time in favor of the servo system stabilization time.

Since the problem of squelch recovery time depends mainly upon the servo system stabilization time it would seem logical to merely decrease the servo loop filtering time constants in an effort to increase the servo loop acquisition time. That approach, however, may not be practical in cases where the servo loop time constants are optimized to parameters of the record or dynamics of the player mechanical systems.

Another parameter of a servo loop which one might consider changing is the loop gain and, in some cases, this can have a generally beneficial effect. In the aforementioned Burrus patent, for example, a squelch signal is applied to an active filter in the velocity correction servo system to reduce its gain to unity when a record is not being played. Burrus did this in order to allow d.c. coupling in the servo while at the same time preventing the flow of large d.c. currents in the correction transducer under no-signal (squelch) conditions thereby avoiding the need for a large d.c. blocking capacitor and the problem with undesired phase shift which otherwise might be introduced by such a capacitor. Although loop gain reduction is desirable for the purpose envisioned by Burrus, such reduction does not guarantee minimum stabilization time of the servo system upon termination of the squelch signal.

The present invention is directed to meeting the need for a fast recovery squelch circuit for use in a video disc player in which the overall stabilization time of the player is substantially reduced and, which avoids the need for waiting a predetermined length of time after initiation of a play command before a usable picture signal is produced.

The squelch circuit of the present invention is particularly adaptable for use in video disc players of the kind comprising a pickup transducer for producing an FM output signal representative of information recorded on a video disc, a video demodulator responsive to said FM signal for producing a video signal and a video signal correction servo system responsive to said video signal and a reference signal for producing an error signal representative of deviations of said video signal from a prescribed relationship with said reference signal and, means for feeding back at least one correction signal to a point in said video disc player in a sense to minimize said deviation.

In accordance with one aspect of the invention, in a video disc player of the kind described above, a squelch circuit is provided for muting the video demodulator and for preconditioning the video signal correction servo system to a predetermined point in its control range of operation.

In accordance with another aspect of the invention, the video signal correction servo system includes a holding capacitor for storing an error signal and the squelch circuit includes a switch arranged to clamp the holding capacitor to a point of reference voltage when closed, the reference voltage being of a predetermined value and means for closing the switch in response to the squelch signal.

In accordance with a further aspect of the invention, the video signal correction servo system includes a cascade connection of low pass filters arranged to apply the error signal to a voltage control oscillator and the squelch circuit further comprises a dead zone amplifier responsive to the output error signal of the cascade connection of low pass filters for feeding back a counter-acting signal to the input of the cascade connection when the output error signal exceeds a predetermined limit value and means are provided for reducing the predetermined value in response to the squelch signal.

In accordance with yet another aspect of the invention, there is provided means responsive to the termination of the FM signal for providing a loss-of-carrier signal, a memory circuit, setting means for placing the memory in a set condition for maintaining the muting of the video demodulator and the preconditioning of the servo system in response to the simultaneous occurrence of the squelch signal and the loss-of-carrier signal and, resetting means responsive to the termination of the loss-of-carrier signal for placing the memory in a reset condition.

The above features and further aspects of the invention are presented in detail in the following description and drawings wherein like reference numbers designate like reference elements and in which.

Figure 1:
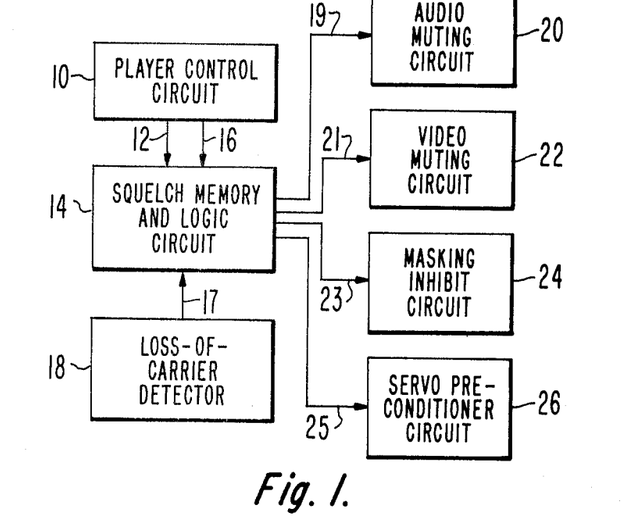
FIG. 1 is a block diagram of a squelch circuit embodying the invention.
Figure 3:
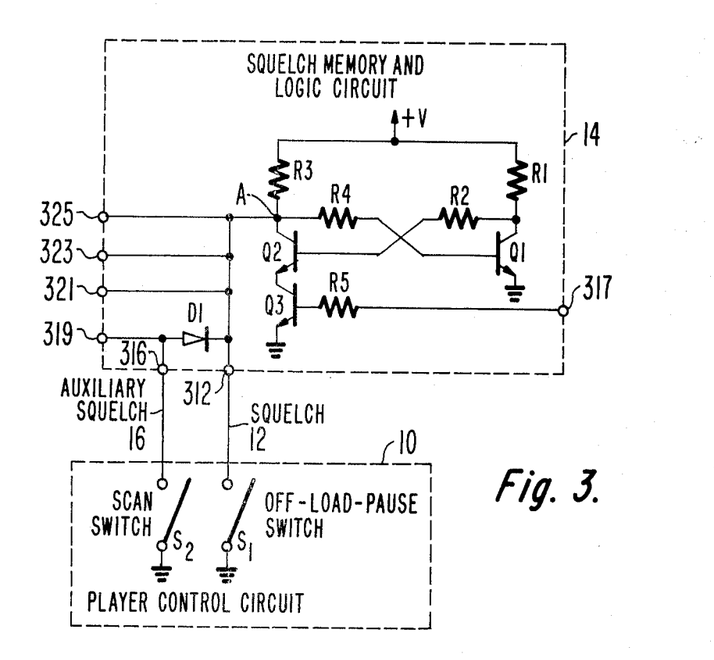
FIG. 3 is a circuit diagram of a squelch memory and logic circuit suitable for implementing the squelch memory and logic functions of the examples of FIGS. 1 and 2.

In FIG. 1 player control circuit 10 has a first output 12 for supplying a squelch signal to squelch memory and logic circuit 14 upon initiation of a first mode of operation of a video disc player and a second output 16 for supplying an auxiliary squelch signal to squelch memory and logic circuit 14 upon initiation of a second mode of operation of the player. Illustratively, the first mode of operation might correspond to a condition where the user turns the player off or to a condition where the user is loading a video disc record into the player, or to a condition where the user interrupts operation of the player momentarily (e.g. a "pause" mode of operation). The first mode of operation corresponds to conditions where no picture is to be viewed in the display. The second mode of operation may correspond to a condition where the user operates controls for causing the player to scan the video disc in search of a desired selection, during which time it is desired that the player produce a picture on the associated display for purposes of locating visually the desired selection. Suitable circuitry for implementing player control circuit 10 is illustrated in FIG. 3.

Squelch memory and logic circuit 14 also receives an input from loss of carrier detector 18, the function of which is to detect termination of an FM output signal produced by the player pickup transducer. In video disc players of the type where the pickup transducer comprises a stylus normally proximate to the surface of the disc during a play operation for sensing compacitance variations in information tracks recorded in the disc, the output of the loss of carrier detector 18 provides an indication of movement of the pickup stylus away from the surface of the disc. Stated another way, loss of carrier detector 18 may be viewed as a stylus position indicator in video disc players of the capacitance pickup type. Loss of carrier detector 18 may comprise any suitable circuitry capable of detecting deviations of the FM output signal beyond predetermined limits or absence of the FM output signal. An example of specific circuitry suitable for implementing the function of loss of carrier detector 18 is given in FIG. 4 and the accompanying discussion.

Squelch memory and logic circuit 14 has outputs arranged to control an audio muting circuit 20, a video muting circuit 22, a defect masking inhibit circuit 24, and a video signal correction servo preconditioner circuit 26 in the video disc player. As will be discussed subsequently, with regard to FIG. 2, it is preferable that the input signal for the video signal correction servo be derived from the output of the video muting circuit via a path through the defect masking circuit.

Audio muting circuit 20 may be implemented in any one of several ways. For example, one might connect a switch in the output of the audio circuits of the video disc player. The switch could be arranged in a series or shunt fashion to attenuate the audio output signal in response to a squelch signal supplied by squelch memory and logic circuit 14. Alternatively, audio muting circuit 20 could be implemented by means of an amplifier in the audio signal processing chain having a variable gain characteristic. Known operational transconductance amplifiers would be suitable for this purpose. Yet another alternative for implementing audio muting circuit 20 would be to apply the squelch signal produced by squelch memory and logic circuit 14 to the limiter circuitry in an audio FM demodulator as disclosed, for example, in the previous mentioned patent of A. L. Baker.

Video muting circuit 22 may be implemented by means of conventional variable gain amplifiers or switching arrangements. It is important however, for purpose of the present invention, that the video muting circuit be located at a point in the video disc player signal processing chain which preceeds the video signal correction servo system. It is further preferable that video muting circuit 22 be of a type which produces no change in direct current quiescent potential when activated.

Defect masking inhibit circuit 24 may comprise a logic gate, a switch or other suitable means coupled to a defect masking circuit (preferably of the recircuilating video type) and responsive to an output signal produced by squelch memory and logic circuit 14 for inhibiting recirculation or substitution of video signals in the defect masking circuit. Examples of appropriate defect masking circuits are disclosed in several issued U.S. patents. See for example, U.S. Pat. No. 3,969,757 entitled "Color Image Signal Processing Circuits" which was issued to J. G. Amery, July 13, 1976; U.S. Pat. No. 4,001,496 entitled "Defect Detection And Compensation Apparatus For Use In An FM Signal Translating System," which issued to J. K. Clemens, et al., Jan. 4, 1977; U.S. Pat. No. 4,038,686 entitled "Defect Detection And Compensation" which was issued to A. L. Baker, July 26, 1977 and, U.S. Pat. No. 4,017,678 entitled "End Of Play Control System" which was issued to A. L. Baker, Apr. 12, 1977.

In the aforementioned U.S. patents, apparatus is disclosed for substituting a stored previous video signal for the video signal produced by the player pickup circuits under high picture defect conditions, typically the substituted signal which is recirculated within the defect masking circuit comprises the previous horizontal line of video information or some portion thereof. The purpose of defect masking inhibit circuit 24 is to prevent such recirculation in response to the squelch signal produced by squelch memory and logic circuit 14 to thereby apply a "null" input signal to the video signal correction servo system (as used herein "null" means an attenuated or inhibited signal). This results because of interposition of the defect masking circuit between the video muting circuit and the video signal correction servo system in the video disc player. Under squelch conditions the null signal produced by the video muting circuit is effectively passed through the defect masking circuit to the video signal correction servo system, whereas, if the defect masking circuit were not inhibited under squelch conditions, it would supply the stored previous horizontal line of video information to the video signal correction servo under squelch conditions.

The video signal correction servo preconditioner circuit 26 comprises an arrangement for preconditioning a video signal correction servo system in the player to a predetermined point in its control range. The servo system may be any of the types previously discussed for providing velocity correction or comb filter center frequency control, or buried subcarrier up-conversion, or any combination of the aforementioned functions.

Preferably, video signal correction servo preconditioner circuit 26 comprises a switch arranged to clamp an error voltage holding capacitor in the video signal correction servo system to a point of reference potential when closed, the reference potential being of predetermined value, and means responsive to the output signal produced by squelch memory and logic circuit 14 for closing the switch. In video disc players of the kind in which the video signal correction servo system includes a cascade connection of low pass filters arrange to apply an error signal to a voltage control oscillator, it is also preferable that video signal correction servo preconditioner circuit 26 include a dead zone amplifier responsive to the output error signal of the cascade connection of low pass filters for feeding back a counteracting signal to the input of the cascade connection when the output error signal exceeds a predetermined limit value, and circuitry responsive to the squelch signal produced by squelch memory and logic circuit 14, for reducing the predetermined limit value of the dead zone amplifier.

Squelch memory and logic circuit 14 includes a flip-flop which is placed in a set condition in response to the simultaneous presence (logical product) of the squelch signal at output 12 of player control circuit 10 and the loss of carrier signal produced by loss of carrier detector 18 and placed in a reset condition in response to termination of the loss of carrier signal. The set signal produced by the flip-flop is logically combined with the squelch and auxiliary squelch signals to supply an enabling signal to audio muting circuit 20 via conductor 19 whenever any one or more of the three signals (set, squelch, auxiliary squelch) are present. Stated another way, in terms of positive logic, audio muting circuit 20 is enabled in response to the inclusive logical sum of the squelch, auxiliary squelch and set signals. The set signal is also logically combined with the squelch signal to supply enabling signals to circuits 22, 24 and 26 via conductors 21, 23 and 25, respectively, whenever any one or both of the set and squelch signals are present. In other words (again, in terms of positive logic) video muting circuit 22, defect masking inhibit circuit 24 and video signal correction servo preconditioner circuit 26 are all enabled by squelch memory and logic circuit 14 in response to the inclusive logical sum of the squelch and set signals.

The above-mentioned functions of squelch memory and logic circuit 14 may be readily implemented using a positive or negative logic convention by means of conventional gates and flip-flops. As an example, assume that the presence of each input signal supplied to circuit 14 is signified by a logic 1 and that the presence of each output signal produced by circuit 14 is also signified by a logic 1. Under those assumptions, the aforementioned functions could be implemented by means of two OR gates, one AND gate, one inverter and one R-S flip-flop. One of the OR gates would have inputs connected to receive the auxiliary squelch signal, the squelch signal and the Q output of the flip-flop for supplying the inclusive logical sum thereof to audio muting circuit 20.

The other OR gate would have inputs connected to receive the squelch signal and the Q output of the flip-flop for supplying the inclusive logical sum thereof to circuits 22, 24 and 26. The set terminal of the flip-flop would be connected to the output of the AND gate and the reset terminal would be connected to the output of the inverter. Inputs of the AND gate would be connected to receive the squelch and the loss-of-carrier signals and the input of the inverter would be connected to receive the loss-of-carrier signal.

One problem in implementing squelch memory and logic circuit 14 with conventional logic elements, as suggested above, is that a large number of elements are required. Moreover, each element itself may comprise from one to four or more transistors (the actual number depends upon the logic family chosen). As a result, reliability is apt to suffer simply because of the relatively large number of parts required and the cost of the circuit in terms of both money and space (area, if the circuit is integrated) will also be high for the same reason. A preferable implementation, which reduces cost and improves reliability, is discussed subsequently in connection with FIG. 3, where it will be seen that all of the functions of squelch memory and logic circuit 14 may be implemented with only three transistors and a diode.

In the following discussion of the overall operation of the squelch circuit of FIG. 1, it will be assumed first that the video disc player is operating in its normal or "play" mode of operation. Under this condition the player pickup transducer is proximate to the surface of the video disc being played and its output circuit produces an FM output signal representative of video information recorded on the disc. The FM output signal is sensed by loss of carrier detector 18 which supplies a signal via conductor 17 to squelch memory and logic circuit 14 which places the previously mentioned flip-flop in its reset condition. Since the player is in its play mode of operation and not in the scan, off, load, or pause operating modes previously mentioned, player control circuit 10 does not supply either a squelch signal or an auxiliary squelch signal to squelch memory and logic circuit 14. As a result, squelch memory and logic circuit 14 supplies disabling signals via conductors 19, 21, 23 and 25 to circuits 20, 22, 24 and 26 respectively. Accordingly, audio and video circuits in the player are not muted by circuits 20 and 22, a defect masking circuit in the player is not inhibited by circuit 24 (and so is primed to provide its normal function of detecting picture defects and substituting the previous horizontal line of video information, or a portion thereof, for the current line of information whenever defects occur) and the video signal correction servo in the player is not preconditioned to a predetermined point within its control range by circuit 26.

Assume now that the user wishes to interrupt normal operation of the player momentarily by placing the player in a "pause" mode of operation. This change in operating modes is sensed by player control circuit 10 which immediately applies a squelch input signal via conductor 12 to squelch memory and logic circuit 14. Regardless of the state of the output of loss-of-carrier detector 18, squelch memory and logic circuit 14 then applies the squelch signal via conductors 19, 21, 23 and 25 to circuits 20, 22, 24 and 26. Very shortly after the user has initiated the "pause" mode of operation, circuitry in the player will automatically move the player pickup transducer from its position proximate to the surface of the record to a position remote from the surface of the record to avoid wear of the pickup transducer during the pause mode of operation. This will cause a loss of the FM output signal of the pickup transducer circuits which will be detected by loss-of-carrier detector 18. When that happens, a signal is supplied to squelch memory and logic circuit 14 via conductor 17 indicating the loss of carrier and since the squelch signal is simultaneously present the flip-flop in circuit 14 will be placed in its set condition which maintains the squelch signal on conductors 19, 21, 23 and 25 as previously described.

The squelch signal on conductor 19 enables audio muting circuit 20 which in turn prevents further production of audio output signals by the player. The reason for muting audio circuits in the player in the pause mode of operation is that, since no FM signal is being produced from the limiters in the player, the audio demodulation circuitry would otherwise produce noise that would be demodulated and amplified and would be objectionable to the user.

The squelch signal on line 21 enables video muting circuit 22 which as previously mentioned precedes the video signal correction circuit in the player signal processing chain. When enabled, video muting circuit 22 causes video circuitry in the player to produce a null output signal rather than a normal video output signal and the null output signal preferably has the same quiescent d.c. level as the normal video output signal.

Presence of the squelch signal on line 23 enables defect masking inhibit circuit 24 which prevents a defect masking circuit in the player from operating in its defect masking mode. If this were not done, the defect masking circuit would begin to substitute the previous horizontal line of video information for its input signal as soon as the FM carrier terminated since the terminated carrier represents, in a sense, a defective picture. Accordingly, video signals stored in the defect masking circuit would be continually supplied to the output of the video disc player in the pause mode of operation and the null signal produced by video muting circuit 22 would not be passed on to the input of the video signal correction servo in the player. Stated another way, defect masking inhibit circuit 24 provides two functions; first it prevents recirculation or substitution of previous video information in the player defect masking circuit which otherwise would appear at the player output as a random pattern on the screen of the player TV monitor and secondly, it causes the defect masking circuit to act, in a sense, as a conduit through which the null signal produced by the muted video circuit in the player is passed on to the player video signal correction servo.

The presence of the squelch signal on line 25 enables video signal correction servo preconditioner circuit 26 which in turn causes the video signal correction servo in the player to assume a predetermined point in its control range. Preferably the point corresponds to the center of the servo control range. Where the player includes three servo systems, as previously mentioned, it is preferable to set each of the servo systems to the center of its control range.

The steps of applying a null input signal to the video signal correction servo and preconditioning the servo to the center of its control range, solve the general problem of maximizing the squelch system recovery time and also solve the seemingly unrelated specific problem faced by Burrus in video disc players of the type employing velocity correction servo transducers.

In more detail, each of the three servo systems previously discussed responds to the FM signal produced by the player pickup circuits when in the play mode of operation for performing its correction function. When the player is first placed in operation it is likely that the FM signal frequency will be in error to a certain extent. It is also likely that this frequency error will obey some form of probability distribution. It is most likely, in the absence of some force which would tend to distort the probability distribution function, that it might resemble a Gaussian distribution. The present invention takes advantage of these probabilities by preconditioning the servo correction system to point in its control range corresponding, in effect, to the center of this distribution of expected frequency errors in the FM signal. As a result, at the moment a play operation is resumed, the output signals of the servo system are already at a value which is close to the final value they are most likely to assume. Even in the less likely case where the initial FM signal produced is at one or the other of its possible extremes, the servo system outputs need change by an amount equal only to one half of its full output range in order to begin correction of the signal. This latter worst case condition not only represents the least likely start up condition for the servo system but the fact that the servo system need only change its output by an amount equal to one half of its complete output signal range, assures minimal acquisition time regardless of the sense of the frequency error in the FM signal.

As to the solution of the Burrus problem previously mentioned, preconditioning of the video signal correction servo to the center of its control range results in a d.c. output voltage which corresponds to a value which will maintain the tangential velocity correction transducer in video disc players incorporating such devices at the center of its control range. Where the transducer is a solenoid (or "voice coil"), this would correspond to a condition of zero current through the solenoid during the squelch mode of operation. Accordingly, the solenoid may be direct current coupled to the output of the video signal correction servo with no need for limiting the solenoid current during the squelch operation.

Consider now the case where the user returns the player to its normal play mode of operation from the pause mode of operation discussed above. The first event to occur will be that the squelch signal produced by player control circuit 10 would immediately terminate and the player pickup transducer will be returned to its position proximate the surface of the record being played. At this point squelch memory and logic circuit 14 will maintain enabling signals on conductors 19, 21, 23 and 25, thereby maintaining the player in a squelch condition because the flip-flop within squelch memory and logic circuit 14 was set during the pause mode of operation. This condition will continue until the loss of carrier detector 18 terminates the signal on conductor 17 thereby resetting the flip-flop. This in turn terminates the enabling (squelch) signals on conductors 19, 21, 23 and 25 whereby the audio and video circuits in the player are immediately unmuted, the defect masking circuit in the player is primed to operate in its normal mode of substituting previous horizontal lines of video information for those containing defects and the preconditioned video signal correction servo system rapidly acquires or locks on to the FM signal produced by the player pickup transducer and begins to produce correction signals. Unlike the prior art approach previously described, all of these events occur immediately upon detection of the FM carrier by loss-of-carrier detector 18 without waiting a predetermined time for stabilization of the video signal correction servo.

As previously mentioned, player control 10 produces an auxiliary squelch signal at output 16 during the "scan" mode of operation of the player. In this mode the user operates a control to cause the player to scan the surface of the video disc to locate a particular selection. To aid in this search, circuits 22, 24 and 26 are not enabled to thereby allow the user to view the video disc monitor picture as the pickup transducer is repositioned on the surface of the disc. Audio muting circuit 20 however, is activated by squelch memory and logic circuit 14 responsive to the auxiliary squelch signal since the audio portion of the recorded signal is not needed for searching purposes and is apt to be somewhat garbled and noisy during the scan mode of operation.

Preconditioning of the servo system to decrease its acquisition or stabilization time is accomplished by the steps of simultaneously applying a null input signal produced by the video muting circuit to the input of the video signal correction servo via the defect masking circuit and, setting the output voltage of the video signal correction servo to the center of its control range. This latter step is accomplished by clamping a loop error voltage holding capacitor in the servo to a reference voltage point of predetermined value. In cases where the servo is used for velocity correction purposes, the dead zone width of a dead zone amplifier in parallel with the loop filters is reduced essentially to zero. In the scan mode of operation the player control circuit 10 produces a signal which mutes only the audio circuit, or circuits in the case of stereo operation.

Figure 2:
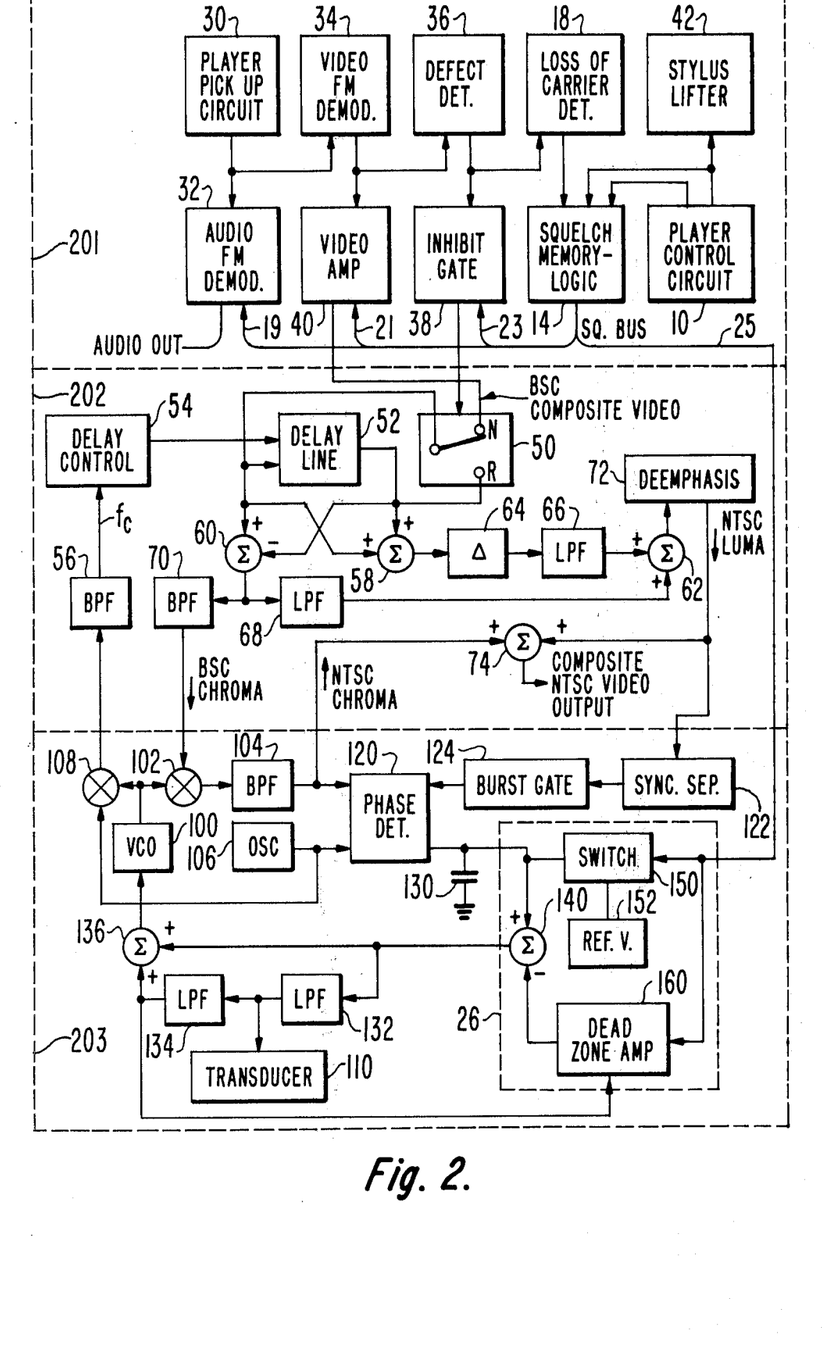
FIG. 2 is a detailed block diagram of a video disc player embodying the invention.

For ease of illustration and explanation, the video disc player of FIG. 2 is divided by dashed horizontal lines into three portions. The upper portion 201 includes the player signal detection and squelch generation circuits. The central portion 202 includes defect masking and comb filtering circuits. The lower portion 203 includes a video signal correction servo system, which provides in one unified arrangement the functions of all three of the previously mentioned servo systems. As will be clear from the following discussion, the present invention applies generally to video disc players having video signal correction servo systems whether the systems are "unified" as shown or separate.

The signal detection and squelch generation portion of the player of FIG. 2 includes a player pickup circuit 30 for supplying FM output signals representative of recorded video and audio information to an audio FM demodulator 32 and a video FM demodulator 34. Illustratively, it will be assumed that the player is intended for use with records in which information is stored in the form of typographical variations and, illustratively, pickup circuit 30 comprises a capacitance-to-voltage converter responsive to capacitance variations between a stylus and the record being played for producing an FM output signal voltage representative of the recorded information. Such records and suitable circuits for implementing the capacitance-to-voltage conversion function of pickup circuit 30 are well known. See, for example, U.S. Pat. No. 3,783,196 entitled "High-Density Capacitive Information Records And Playback Apparatus Therefor" which issued to T. O. Stanley, Jan. 1, 1974; U.S. Pat. No. 3,972,064 entitled "Apparatus And Methods For Playback Of Color Pictures/-Sound Records" which issued to E. O. Keizer, July 27, 1976; and U.S. Pat. No. 3,711,641 entitled "Velocity Adjusting System" which issued to R. C. Palmer, Jan. 16, 1973.

Audio FM demodulator 32 converts the FM signal produced by pickup circuit 30 to an audio output signal. Audio muting circuit 20 discussed in connection with FIG. 1 is included within demodulator circuit 32 for muting the audio output signal in response to an enabling (squelch) signal on conductor 19. Demodulator 32 may be of conventional design and may be an integrated circuit such as the type CA2111 "FM IF Amplifier-Limiter And Quadrature Detector," which is commercially available. Audio muting may be provided by means of a conventional series or shunt switching of the demodulator output in response to the squelch signal on conductor 19. The need for output switching can be avoided completely, however, by applying the signal on conductor 19 to the limiter stage in the demodulator so as to disable the limiter when the squelch signal is present. This approach to muting audio circuitry in a video disc player is generally known from the previously mentioned U.S. Pat. No. 4,017,677 of A. L. Baker.

Video FM demodulator circuit 34 converts the FM signal produced by pickup circuit 30 to a video output signal. For purposes of illustrating certain features of the squelch system operation, it will be assumed that the video signals recorded on the disc are in a "buried subcarrier" (BSC) format rather than the conventional NTSC format. As is known (see, for example, U.S. Pat. No. 3,872,498 entitled "Color Information Translating Systems," which issued to D. H. Pritchard, Mar. 18, 1975), in the BSC format chrominance information is represented by a color subcarrier of the general form employed in the well-known NTSC system. However, the chrominance component is not located in the high end of the luminance signal video band, as in the NTSC system, but rather is buried in a lower portion of the video band. An illustrative subcarrier frequency choice is in the vicinity of 1.53 MHz, with the color subcarrier side bands extending ±500 KHz thereabout and, with the luminance signal band extending well above the highest color subcarrier frequency (to 3 MHz, for example).

Defect detector 36 is responsive to signals produced by FM demodulator 34 for detecting picture defects and supplying a signal to the defect masking portion of the player which causes the masking circuit to substitute a previous line of video signal or a portion of the previous line, for the current line containing the defect. The defect signals are supplied via inhibit gate 38 which corresponds to defect masking inhibit circuit 24 in FIG. 1. The inhibit circuit may be, for example, a series or shunt switch arranged to block the defect detector output signals when the squelch signal on conductor 23 is present and pass the signals otherwise. Gates suitable for blocking or passing signals are well known.

Implementation of detector 36 depends to a certain extent on implementation of the FM demodulator 34 which may be, for example, of the pulse counting type or of the phase lock-loop type.

Where the FM demodulator is of the pulse counting type, defect detector 36 may be implemented as shown in U.S. Pat. No. 4,038,686 entitled "Defect Detection And Compensation," which issued to A. L. Baker, July 26, 1977. Alternatively, FM demodulation 34 and defect detector 36 may be of the phase lock-loop type implemented as shown in the U.S. Pat. No. 4,203,134, of T. J.

Christopher, et al., entitled "FM Signal Demodulator With Defect Detection," which was filed Oct. 2, 1978.

The BSC video signals produced by video FM demodulator 34 are supplied to the defect masking and comb filtering portion of the player via video amplifier 40 which corresponds in this example of the invention to the video muting circuit 22 of FIG. 1. The amplifier has an inhibit input responsive to the presence of the squelch signal on conductor 21 of the squelch bus for inhibiting transfer of the BSC video signal to the defect masking and comb filtering circuits and substituting therefore a null or attenuated output signal. Preferably, as previously mentioned, the quiescent d.c. output level of the amplifier does not change between the enabled and inhibited conditions of the amplifier. An inhibitable amplifier having these characteristics is disclosed, for example, in the allowed U.S. patent application of B. J. Yorkanis entitled "Inhibit Circuit For A Differential Amplifier," Ser. No. 41,752, which was filed May 23, 1979 and is assigned to the assignee of the present invention.

Figure 4:
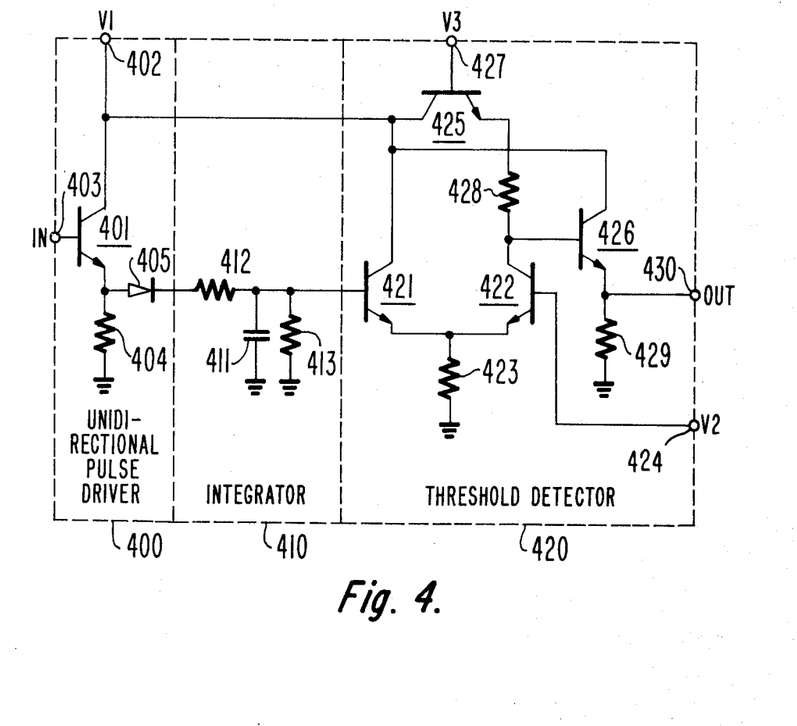
FIG. 4 is a schematic diagram of a loss-of-carrier detector suitable for providing loss of carrier detection in the examples shown in FIGS. 1 and 2.

Loss-of-carrier detector 18 provides the function (previously mentioned in the discussion of FIG. 1) of detecting termination of the FM signal produced by pickup circuit 30. While this could be accomplished directly (for example, by measurement of the maximum or minimum period of the FM signal or its signal-to-noise ratio) a preferable way is to do it indirectly, as shown, to take advantage of the fact the output of defect detector 36 may be further processed with relatively little additional circuitry to arrive at the same end result. FIG. 4, which will be discussed subsequently, gives an example of how this may be done.

Loss of carrier detector 18, squelch memory and logic circuit 14 and player control circuit 10 are implemented, interconnected and function generally as set forth in FIG. 1 and the description thereof. Overall operation of the squelch system as applied to the player of FIG. 2 will be reviewed subsequent to the following discussion of the remaining portions of the player.

Stylus lifter 42 is coupled to output 12 of player control circuit 10 for moving the pickup stylus away from its normal play position proximate to the surface of the record in response to the squelch signal produced by circuit 10 when the player is in an "off", "load" or "pause" mode of operation. The stylus lifter may comprise, for example, a solenoid or an electromagnet suitably coupled to the stylus. See, for example, U.S. Pat. No. 3,972,533 entitled "Signal Pickup Lifting/Lowering Apparatus" which issued to L. D. Huff, Aug. 3, 1976; U.S. Pat. No. 4,053,161 entitled "Stylus Arm Lifting/Lowering Apparatus For A Video Disc Player," which issued to J. C. Bleazey, et al., Oct. 11, 1977; and U.S. Pat. No. 4,059,277 entitled "Stylus Arm Lifting/Lowering Apparatus For A Video Disc Player" which issued to R. DeStephanis, Nov. 22, 1977.

The central portion of FIG. 2 includes a comb filtering circuit and a defect switch. The filtering circuit derives a BSC chrominance signal and an NTSC luminance signal from the BSC composite video signal supplied by video amplifier 40. The defect switch 50 is controlled by the output of inhibit gate 38 for providing defect masking.

With the exception of defect switch 50, the comb filtering circuit is similar to the variable comb filter described in the U.S. Pat. No. 4,195,309 of T. J. Christopher and L. L. Tretter entitled "Video Processing System Including Comb Filters", which was filed Dec. 4, 1978. Although the present invention may be practiced with other suitable variable center frequency comb filter arrangements (such as, for example, that disclosed in U.S. Pat. No. 3,996,610 entitled "Comb Filter Apparatus For Video Playback Systems" which issued to H. Kawamoto, Dec. 7, 1976) or non-variable center frequency comb filter arrangements (see, for example, U.S. Pat. No. 3,872,498 entitled "Color Information Translating Systems" which issued to D. H. Pritchard Mar. 18, 1975), the arrangement of Christopher et al., (modified to include defect switch 50) is preferred.

The reasons for this preference relate in part to filtering efficiency and in part to simplification of squelch circuitry. Both Christopher et al., and Kawamoto provide improved filtering efficiency over fixed center frequency filter arrangements by varying the center frequency in a sense to compensate for spurious frequency errors which may be present in the BSC video input signal. The Christopher et al. comb filter is prefered over Kawamoto for purposes of the present invention because in Christopher et al. the same servo system which provides up-conversion of the recovered BSC chrominance signal also provides the signal for controlling the center frequency of the comb filter whereas Kowamoto uses a separate servo for this purpose. Accordingly, squelch circuitry for implementing the present invention is simplified because only one servo system need be preconditioned during the squelch period.

Turning now to the details of the defect masking and comb filtering circuits, switch 50 and delay line 52, which is preferably of the CCD type, provide the function of defect masking. Switch 50, controlled by the output of inhibit gate 38, connects the input of CCD delay line 52 to the output of video amplifier 40 when in its "normal" (N) position and connects the output of delay line 52 to the input thereof when in its "recirculation" position (R). In operation, with no squelch applied to inhibit gate 38 or video amplifier 40, any defect signals produced by defect detector 36 will be applied to switch 50 via inhibit gate 38 to place switch 50 in its recirculation position whereupon the video signal present in delay line 52 will be continuously recirculated. This "recirculation" corresponds, in essence, to a substitution of the previous video signal for the current one containing the "defect" and continues as long as switch 50 remains in position R. Termination of the defect signal produced by defect detector 36 places switch 50 in its normal position whereupon the comb filtering circuitry immediately begins processing of the current video signal supplied by amplifier 40.

Under squelch conditions, inhibit gate 38 blocks application of defect pulses to switch 50 thereby maintaining switch 50 in its normal position. Simultaneously video amplifier 40 produces a null output signal and, since switch 50 is in its normal position, this null signal is applied to the input of delay line 52. As will be explained in detail subsequently, the null signal produced by video amplifier 40 under squelch conditions is, in effect, passed through the comb filter circuits thereby inhibiting production of the BSC chrominance and NTSC luminance signals and, this has the further effect on the video signal correction servo of inhibiting operation of its phase detector. This comprises one of three steps for preconditioning the servo system of this particular example of the invention to a predetermined point in its control range.

Turning now to the details of the comb filtering circuits, delay line 52 provides dual functions of both storage of video signals for purposes of defect masking as previously described and delay of video signals for purposes of comb filtering. Preferably, delay line 52 is of the charge coupled device (CCD) delay line of the buried channel type (e.g. as described in the article by J. Matov, entitled "Charged Coupled Devices" which appeared in the January, 1975 issue of Wireless World). The delay provided by delay line 52 is controlled by delay control circuit 54 which may comprise (as shown in the aforementioned Christopher et al. application) a phase lock loop frequency multiplier having an output coupled to clock driver circuitry for controlling the rate of charge transfer through the delay line and thus the amount of delay. Since the center frequency of a comb filter is a function of the delay provided by its delay element, the frequency of the control signal supplied to delay control circuit 54 thus necessarily controls the center frequency of the filter.

The comb filter center frequency control signal is produced by the video signal correction servo, as will be explained, and is band pass filtered by band pass filter 56 prior to application to the PLL frequency multiplier in delay control circuit 54. The reason for band pass filtering is that the control signal is produced by a multiplication process in the servo system and so may contain undesired product terms.

The input and output signals of delay line 52 are coupled to an adder 58 where they are additively combined thereby forming a comb filter which separates the luminance component from the composite color video signal. When the control signal $f_c$ supplied to delay control circuit 54 is at a nominal frequency (indicative of no spurious deviations of the composite signal frequencies), this luminance comb filter has a frequency response characterized by multiple response peaks falling at even multiples of half the nominal horizontal line frequency and multiple rejection notches falling at odd integral multiples of half the nominal line frequency.

The output signal of delay line 52 is subtracted from its input signal by subtractor 60 to form another comb filter which passes the chrominance component of the composite video signal. When the control signal $f_c$ is at its nominal frequency, this chrominance comb filter has a frequency response characteristic having multiple response peaks falling at odd integral multiples of half the nominal line frequency and multiple rejection notches falling at even integral multiples of half the nominal line frequency.

Since the frequency range of the luminance signal component in the BSC format is the same as in the NTSC format, all that remains to provide a proper NTSC luminance output signal is to compensate for preemphasis which was performed in the recording process and to supplement the signal with information relating to vertical detail which was lost in the luminance comb filtering process. Vertical detail supplementation is provided by coupling the output of adder 58 to one input of a further adder 62 via a delay element 64 and a low pass filter 66 and coupling the output of subtractor 60 to the other input of adder 62 via a low pass filter 68. Suitable design parameters for the coupling elements would be: a delay of about 500 nSec for delay element 64 (this compensates for the delay through low pass filter 68); a pass-band of 0–5 MHz for low pass filter 66; and a pass-band of 0–500 kHz for low pass filter 68. Compensation for preemphasis is provided by coupling the output of adder 62 to the input of deemphasis circuit 72 which preferably has a transfer characteristic complementary to that of the preemphasis circuit used in recording the video disc.

The output of subtractor 60 contains both low frequency information (which is passed by low pass filter 68 for supplementing vertical detail of the luminance signal as previously mentioned) and the chrominance signal in BSC format. The low frequency information is rejected by connecting the output of subtractor 60 to the input of band pass filter 70 which preferably has a pass band of about 1 MHz centered at the BSC color burst frequency of nominally 1.53 MHz.

Since the frequency range of the chrominance signal in the BSC format is lower than its range in the NTSC format, up-conversion of the output signal of band-pass filter 70 is necessary before the chrominance and luminance signals may be added (in adder 74) to produce a NTSC composite video signal. This is one of several functions provided by the video signal correction servo system occupying the lower portion of FIG. 1.

Before considering the details of the video signal correction servo system it is helpful first to consider the tasks it is intended to perform under normal operation and how those tasks change when in the squelch mode of operation. Under normal operating conditions (play or scan mode) the servo system shown is designed to provide all of the functions of the three separate servo systems previously discussed in the background portion of this specification. Specifically, it provides: (1) up-conversion of the BSC format chrominance signal to the NTSC format; (2) comb filter center frequency control for maximizing filtering efficiency and compensating for spurious variations thereof; and (3) control of a stylus tangential position control transducer for providing velocity error correction.

In the squelch mode of operation, the servo system is designed to respond the squelch signal supplied directly to it via conductor 25 and to the null signal produced by video amplifier 40 (which, as previously mentioned, terminates or nulls both the BSC chrominance and the NTSC luminance signals at the servo system inputs) for: (1) setting a BSC-to-NTSC chrominance signal up-modulator to the center of its control range; (2) setting the comb filter circuit to the center of its control range and (3) setting the velocity correction transducer to the center of its control range.

The advantage of utilizing a "unitary" servo system to perform all of the three normal operating functions mentioned above is that the squelch circuitry required to perform all of the three squelch mode functions is greatly simplified. This both improves the reliability of the player and provides a cost saving.

Up-conversion of the BSC chrominance signal (nominally 1.53 MHz) to the NTSC frequency (nominally 3.58 MHz) for addition to the NTSC luminance signal in adder 74 is provided in the servo system of FIG. 2 by voltage controlled oscillator (VCO) 100, multiplier 102 and band-pass filter 104. The output frequency of VCO 100 when at the center of its control range is nominally 5.11 MHz. Accordingly, multiplier 102, which mixes or multiplies the BSC chrominance signal produced at the output of band-pass filter 70 with the output of VCO 100, produces output signals of nominally 3.58 and 6.64 MHz. Band-pass filter 104 passes the lower frequency signal (which corresponds to the NTSC chrominance signal standard) to adder 74 where it is summed with the NTSC luminance produced at the output of deemphasis circuit 72 to thereby provide a composite video output signal in the NTSC format for the video disc player.

Multiplier 102 and band-pass filter 104 may be of conventional design. It is desirable, however, that VCO 100 feature high stability and be capable of wide frequency deviation since it provides compensation for errors in the frequency of the BSC chrominance signal as well as the center frequency of the comb filter circuits. A preferred voltage controlled oscillator having a wide deviation range, is disclosed in the U.S. patent application of T. Christopher and J. Wilber entitled "Variable Frequency Oscillator" Ser. No. 051,826 which was filed on June 25, 1979.

Comb filter center frequency control is provided by the video signal correction servo by VCO 100, oscillator 106 and multiplier 108. Oscillator 106 is crystal controlled for producing an output signal having a frequency equal to the NTSC standard sub-carrier frequency of 3,579,545 Hz. Multiplier 108 which receives the output signal of VCO 100 and the reference signal of oscillator 106 therefore, produces output signal frequencies of nominally 1.53 and 8.69 MHz when VCO 100 is at its nominal center frequency (5.11 MHz). One of these signals (preferably the lower frequency one) is passed by band-pass filter 56 for supplying the center frequency control signal $f_c$ to the delay control circuit 54 which, as previously explained, controls the center frequency of the comb filters.

The nominal frequency of VCO 100 (5.11 MHz) corresponds to a predetermined value of control voltage applied to its input and the parameters of the delay control circuit 54 and delay line 52 such that the comb filter is nominally centered in its control range when $f_c$ equals 1.53 MHz (alternatively 8.69 MHz). Accordingly, applying the predetermined reference voltage to the input of VCO 100 will place the comb filter circuit in the center of its control range i.e., the point where maximum luminance and chrominance output signals are produced assuming no frequency error in the BSC composite video signal supplied to the comb filtering circuits.

Velocity error correction is provided in the servo system of FIG. 2 by means of transducer 110 which is mechanically coupled to the player pickup transducer for controlling the tangential position of the pickup stylus relative to the video information track recorded on the video disc. If the disc is out-of-round, for example, transducer 100 changes the effective length of the pickup arm in consinance with rotation of the disc in a sense to compensate for its eccentricity. Transducers (commonly called "arm stretcher" transducers) suitable for performing this function are described, for example, in U.S. Pat. No. 3,882,267 entitled "Video Playback System Tracking Arm And Pickup Assembly" which issued to M. A. Leedom, May 6, 1975 and U.S. Pat. No. 3,983,318 entitled "Velocity Correction System With Damping Means" which issued to M. E. Miller and J. G. Amery, Sept. 28, 1976.

Control of VCO 100 and arm stretcher transducer 110 is provided by means of a color burst keyed phase detector 120 which compares the color burst component of the chrominance signal produced at the output of band-pass filter 104 with the standard NTSC reference frequency (3,579,545 Hz) produced by reference oscillator 106. Keying of phase detector 120 is provided by sync separator 122 which detects the horizontal synchronizing pulse in the NTSC type luminance signal produced at the output of deemphasis circuit 72 and supplies an enabling signal to burst gate 124 when each horizontal synchronizing pulse appears. Burst gate 124 then enables phase detector 120 during the so-called "back porch" interval of the horizontal synchronizing pulse where the color burst signal is located. Since phase detector 120 is only enabled during the color burst interval, its output (which represents the servo system control or "error"0 voltage) is stored for the remainder of the horizontal line interval by means of holding capacitor 130.

The error voltage of capacitor 130 is applied to the input of a cascade connection of two low-pass filters 132 and 134 and summed with the output of the cascade connection by summing circuit 136 to provide control voltage for VCO 100. The output of the first filter 132 of the cascade is applied to transducer 110. The purpose of filters 132 and 134 is to maximize the servo loop gain for transducer 110 at a frequency of about 7.5 Hz and to maximize the loop gain for VCO 100 at a frequency of about 0.27 Hz. By this means the servo functions of VCO 100 and transducer 110 are separated with transducer 110 mainly correcting for gross velocity errors such as might be caused, for example, by a warped or eccentric record. VCO 100 then compensates mainly for very low frequency errors (due, for example, to power line frequency variations influencing the turntable rotational velocity) and relatively high frequency errors (due for example, to spurious variations in the recovered video signal). Filters 132 and 134 may be implemented as described, for example, in U.S. Pat. No. 3,965,482 entitled "Velocity Correction Circuit For Video Discs" which issued to T. W. Burrus, June 22, 1976.

Operation of the portion of the servo system described thus far is most easily understood by considering first the situation where the frequency of the color burst signal equals that of oscillator 106 and is in phase quadrature therewith. In that case, no error exists and capacitor 130 will be charged by phase detector 120 to a voltage which will maintain VCO 100 at its nominal center frequency value (5.11 MHz) and position transducer 110 to the center of its control range. Should a change occur in the color burst frequency or phase, the voltage on capacitor 130 will change thereby causing the frequency of VCO 100 and the position of transducer 110 to vary in a sense to counteract the change in the color burst signal.

The squelch circuitry for the servo system comprises a switch 150 arranged to clamp holding capacitor 130 to a source of reference voltage 152 when closed. The reference voltage is of a predetermined value corresponding to the zero error condition of the servo system and the squelch signal on conductor 25 is supplied to the switch for closing it whenever the squelch signal is present.

The squelch circuitry further comprises a dead zone amplifier 160 responsive to the output error signal of the cascade connection of low pass filters 132, 134 for feeding back a counteracting signal to the input of the cascade connection (via summing circuit 140) when the output error signal exceeds a predetermined limit value. Circuitry within the amplifier responsive to the squelch signal on conductor 25 reduces the predetermined limit value when the squelch signal is present. Preferably, amplifier 160 is of the kind having a dead zone of controllable width which determines the predetermined limit value and preferably the dead zone width is reduced to zero in response to the presence of the squelch signal on conductor 25. A dead zone amplifier adaptable for this purpose is described in U.S. Pat. No. 3,851,259 entitled "Dead Zone Circuit" which issued to D. J. Parwaski Nov. 29, 1974. A preferred dead zone amplifier is described by J. Wilber and B. Yorkanis in their U.S. patent application Ser. No. 058,022, entitled "Amplifier Having Dead Zone of Controllable Width And Position," which was filed July 16, 1979.

Dead zone amplifier 160 protects transducer 110 from excessive d.c. current flow in both the squelched and unsquelched operating modes of the player. Protection in the unsquelched mode is provided by adjusting the position of the dead zone to equal the d.c. voltage level at the output of low-pass filter 134 which corresponds to the nominal "center" of the servo operating range and adjusting the width of the dead zone to equal the maximum expected peak-to-peak variations of the d.c. voltage. Accordingly, if a d.c. transient greater than the normal servo signal should occur, it will be amplified by amplifier 160 and applied as a negative feedback signal to summing circuit 140 thereby reducing the servo loop gain and thus limiting the current to transducer 110 to a maximum value.

In the squelch mode of operation, the squelch signal applied via conductor 25 to amplifier 160 reduces its dead zone width to zero. Accordingly, amplifier 160 then continuously applies the output of low pass filter 134 to the input of summing circuit 140 thereby reducing the servo loop gain and limiting the current to transducer 110. At the same time, switch 150 clamps the holding capacitor 130 to the reference voltage source 152, which corresponds to the servo system zero error voltage. As a result, VCO 100 and transducer 110 are both set to the center of their respective control ranges.

The general overall operation of the remainder of the squelch circuitry of FIG. 2 is substantially the same as that previously described for FIG. 1, and so need not be repeated here. One point not covered extensively in the previous discussion, however, concerns the effects on the servo system of the null signal produced by video amplifier 40. Recall that under squelch conditions, this null signal propagates through the defect masking and comb filtering circuits to the servo system. In so doing, it clears delay line 52 of previous video information, which prevents the appearance of random patterns on the TV monitor receiving the player output signals. Its effect on the servo system is to prevent operation of the keyed phase detector 120. This results because phase detector 120 is keyed by sync pulses separated from the NTSC luminance signal by sync separator 122 and the NTSC luminance signal is replaced by the null signal under squelch conditions.

The significance on servo system performance of disabling phase detector 120 is that it greatly reduces the requirements of switch 150. Recall that the purpose of switch 150 is to clamp capacitor 130 to the potential of reference voltage source 152 under squelch conditions. If phase detector 120 was not disabled at the same time, it might attempt to periodically alter the capacitor voltage and so to be effective, switch 150 would have to provide a much lower impedance source for capacitor 130 than phase detector 120. This constraint is eliminated by disabling phase detector 120 so that switch 150 may be of any suitable design. One may, for example, employ a complementary field effect transmission gate for switch 150. Alternatively, it may be implemented by a relay or by a complementary or a non-complementary bipolar transmission gate. To summarize, video demodulator is muted under squelch operating conditions and since it preceeds the servo system in the video signal processing chain, the phase detector is thereby disabled.

In FIG. 3 squelch memory and logic circuit 14 comprises a pair of cross-coupled transistors Q1 and Q2 which form a flip-flop. The collector of grounded emitter transistor Q1 is coupled to a source of supply voltage +V via a load resistor R1 and to the base of transistor Q2 via current limiting resistor R2. The collector of transistor Q2 is coupled to the supply voltage source via load resistor R3 and to the base of transistor Q1 via current limiting resistor R4 with the common connection of resistors R3 and R4 forming an input/output node A.

Node A serves both as a bidirectional data port for the flip-flop and as a wired-OR (negative logic convention) connection for providing the inclusive logical sum of two variables. It is coupled to terminals 321, 323 and 325, to the cathode of diode D1 and to input terminal 312. The anode of diode D1 is coupled to output terminal 319 and to input terminal 316.

The conduction path of transistor Q3 is connected in series with that of transistor Q2 between node A and ground. The base of transistor Q3 is coupled to input terminal 317 via current limiting resistor R5. Transistor Q3 provides the dual functions of priming and resetting the flip-flop formed by transistors Q1 and Q2.

Output terminals 319, 321, 323 and 325 are for providing output signals to conductors 19, 21, 23 and 25, respectively, in the examples of FIGS. 1 and 2. Input terminal 317 is for connection to the output of loss-of-carrier detector 18 which supplies a positive voltage thereto when the FM carrier is not present and a ground level voltage thereto when the carrier is present. Input terminals 312 and 316 are connected, respectively, to outputs 12 and 16 of player control circuit 10. This circuit includes a first switch, S1, which grounds line 12 when the player is in an OFF, LOAD or a PAUSE mode of operation. Circuit 10 also includes a second switch S2 which grounds line 16 when the player is in a SCAN mode of operation.

The logic convention employed in circuits 14 and 10 is that a ground lever signal represents a logic 1, "true" or enabled state and a positive voltage level signal represents a logic 0, "false" or disabled state. If in a given situation it is necessary to obtain a complementary output signal for purposes of interfacing with one or more elements of the systems of FIG. 1 or 2, one has several options. For example, an inverter could be connected between the desired output terminal and the circuit which is to be interfaced. Alternatively, one could derive the desired complementary output signal from the collector of transistor Q1. As a further alternative, one could simply change the logic convention by reversing the transistor conductivity types, the poling of diode D1 and all power and ground connections. Other variations, such as substituting field effect transistors for the bipolar illustrated transistors will be readily apparent to one of skill in the art.

The logic functions of the squelch memory and logic circuit are the same as previously described in the discussion of FIG. 1. The circuit functions are as follows. Terminal 319 is grounded for supplying an enabling signal to audio muting circuit 20 via conductor 19 whenever either switch S2 is closed or switch S1 is closed or the flip-flop is SET (node A grounded, Q2 and Q3 ON). Terminals 321, 323 and 325 are grounded for supplying enabling signals to video muting circuit 22, defect masking inhibit circuit 24 and video signal correction servo preconditioner circuit 26 via conductors 21, 23 and 25 whenever either switch S1 is closed or the flip-flop is set.

Setting of the flip-flop in squelch memory and logic circuit 14 is a function of the logical product of two variables, namely, the position of switch S1 and the output voltage of loss-of-carrier detector 18. To illustrate, assume that the player is in a normal or "play" mode of operation. In that case, switch S1 will be open and the output of loss-of-carrier detector 18 will be low (ground level) signifying the presence of the FM carrier. As a result, transistors Q2 and Q3 will be off, Q1 will be ON and node A will be high. If now the player is placed in the "pause" mode, switch S1 will close, thereby clamping node A to ground potential. This will turn off transistor Q1 causing its collector voltage to assume some positive value and this in turn will apply turn-on bias to the base of Q2 via resistor R2. Transistor Q2, however, can not turn on at this point because its conduction path is in series with that of the loss-of-carrier detector. Eventually, however, the FM signal will terminate and when this is detected by detector 18 transistor Q3 will be turned on. When that occurs the flip-flop will latch in its set condition with both transistors Q2 and Q3 conducting and transistor Q1 non-conducting. The flip-flop will remain set as long as loss-of-carrier detector 18 supplies a positive voltage to terminal 317 and will remain set even after switch S1 opens because of the regenerative feedback between transistors Q1 and Q2. Resetting of the flip-flop (or, more accurately, disabling of its latched set condition) occurs whenever the loss of carrier signal supplied to terminal 317 terminates (signifying presence of the FM carrier).

The loss of carrier detector 18 described in connection with FIGS. 1 and 2 may be implemented as shown in FIG. 4 by a cascade connection of a unidirectional pulse driver 400, an RC integrator 410 and a threshold detector 420. Pulse driver 400 comprises an emitter follower transistor 401 connected at its collector to a supply voltage terminal 402 for receiving a source of supply voltage (which may be unregulated). The base of transistor 401 is connected to an input terminal 403 for receiving "defect pulses" from the output of defect detector 36 (FIG. 2). The emitter of transistor 401 is coupled to ground via load resistor 404 and to the anode of diode 405.

The purpose of the emitter follower is to provide a low impedance source of charging current for integrator 410 so that its charging time constant is determined by the values of its elements and not by the output impedance of the defect detector. The purpose of diode 405 is to allow charging current to flow to the integrator when a defect pulse appears while preventing discharge of the integrator through the emitter follower in the absence of defect pulses so that the discharge time constant for the integrator is determined by its element values and not by the driver circuit characteristics.

Integrator 410 comprises a capacitor 411 having one plate grounded, a charging resistor 412 connected between the other plate of capacitor 411 and the cathode of diode 404 and a discharging resistor 413 connected in parallel with the capacitor. The charging time constant is determined by selection of the values of resistors 412 and 413 and capacitor 411. If the value of resistor 413 is much greater than that of resistor 412 the charging time constant will depend mainly on resistor 412 and the value of capacitor 411 (the main purpose of resistor 413 is simply to provide a discharge path for capacitor 411).

Threshold detector 420 comprises a pair of emitter coupled transistor 421 and 422 supplied with emitter current via resistor 423 which is coupled to ground. The base of transistor 421 is connected to the output of integrator 410 and that of transistor 422 connects to a supply terminal 424 for receiving a threshold setting voltage V2 from a source of threshold voltage (not shown). The collector of transistor 421 and the collector of a series pass voltage regulator transistor 425 and the collector of an emitter follower output transistor 426 are all connected to terminal 402 for receiving the unregulated supply voltage V1.

The base of transistor 425 is connected to supply terminal 427 for receiving a source of regulated voltage V3 which is intermediate V1 and V2. The purpose of transistor 425 is to supply regulated voltage to the collector load resistor 428 which is connected between the collector of transistor 422 and the emitter of transistor 425. The advantage of this "local regulation" in detector 420 is that a much smaller regulator transistor can be used than could be the case if the collector voltages of transistor 401, 421 and 426 were regulated (transistor 401, it will be recognized, is a pulse driver and therefore demands large intermittent currents). The base of emitter follower transistor 426 is connected to the collector of transistor 428 and its emitter is connected to ground via load resistor 429 and to output terminal 430.

In operation, assume first that capacitor 411 is discharged and that no defect pulses are applied to terminal 403. In that case, transistor 421 will be off, transistor 422 will be on and a relatively low output voltage will be produced at output terminal 430 due to the voltage drop appearing across load resistor 428. Recall that defect pulses are produced by defect detector 36 whenever the frequency (or phase) of the FM video signal exceeds normal limits. Continued defect pulses thus represent either an abnormally noisy (snowy) picture or a complete loss of the FM carrier signal. Should such a situation occur the pulses supplied to integrator 410 via pulse driver 400 will eventually change capacitor 411 to a voltage level greater than the threshold voltage V2 applied to terminal 424. What that happens transistor 421 will turn on and transistor 422 will turn off thereby causing a decrease in the voltage drop across load resistor 428. As a consequence the output voltage at output terminal 430 will increase to the potential of supply V3 (less the sum of the base emitter offset voltages of transistors 425 and 426). This high output voltage signifies the "loss-of-carrier" or "high defect" condition of the FM signal.

What is claimed is:

1. A squelch circuit for use in a video disc player of the kind comprising a pickup transducer for producing an FM output signal representative of information recorded on a video disc, a video demodulator responsive to said FM signal for producing a video signal and a video signal correction servo system responsive to said video signal and a reference signal for producing an error signal representative of deviations of said video signal from a prescribed relationship with said reference signal, means for feeding back at least one correction signal to a point in said video disc player in a sense to minimize said deviations, said squelch circuit being arranged to apply a squelch signal to a point in said video signal correction servo system, wherein said video signal correction servo system includes a phase detector for producing said error signal and a holding capacitor for storing said error signal, the improvement wherein said squelch circuit comprises:

switch means arranged to clamp said holding capacitor to a source of reference voltage of a given value when closed; and circuit means responsive to said squelch signal for supplying a muting signal to said video demodulator to disable said phase detector in said video signal correction servo system and for supplying a closure signal to said switch means for preconditioning said video signal correction servo system to a predetermined point in its control range corresponding to said given value of said reference voltage.

2. A squelch circuit as recited in claim 1 wherein said video signal correction servo system includes a cascade connection of low-pass filters arranged to apply said error signal to a voltage controlled oscillator and, wherein said circuit means further comprises:

a dead-zone amplifier responsive to the output error signal of said cascade connection of low-pass filters for feeding back a counteracting signal to the input of said cascade connection when said output error signal exceeds a predetermined limit value; and means responsive to said squelch signal for reducing said predetermined limit value.

3. A squelch circuit as recited in claim 1 further comprising:

means responsive to the termination of said FM signal for providing a loss-of-carrier signal;

memory means in said circuit means;

setting means for placing said memory means in a set condition for maintaining the muting of said video demodulator and the preconditioning of said servo system in response to the simultaneous occurrence of said squelch signal and said loss-of-carrier signal; and resetting means responsive to the termination of said loss-of-carrier signal for placing said memory means in a reset condition.

4. A squelch circuit as recited in claim 3 wherein:

said memory means comprises a flip-flop including a pair of cross coupled transistors;

said setting means comprises means for applying said squelch signal to the control electrode of one of said transistors and switch means in series with the conduction path of the other of said transistors responsive to said loss-of-carrier signal for closing; and said resetting means comprises means responsive to said termination of said loss-of-carrier signal for opening said switch means.

5. A squelch circuit as recited in claim 1 further comprising a defect masking circuit of the recirculating video type and means responsive to said squelch signal for inhibiting recirculation of video signals in said defect masking circuit.

6. A squelch circuit as recited in claim 5 wherein said defect masking circuit includes an output for supplying said video signal to said video signal correction servo system whereby in response to said squelch signal a null signal produced by said video demodulator in its muted condition is applied to said video signal correction servo system via said defect masking circuit.

7. A squelch circuit as recited in claim 1 further comprising:

a player control circuit in said video disc player having a first output for providing said squelch signal upon initiation of a first mode of operation of said player and a second output for providing an auxiliary squelch signal upon initiation of a second mode of operation of said player;

a mutable audio FM demodulator for recovering an audio signal from said FM signal; and means for applying the logical sum of said squelch signal and said auxiliary squelch signal to said mutable audio FM demodulator for muting the audio output of said player during both of said modes of operation.

8. A squelch circuit as recited in claim 1 wherein said video signal correction servo provides a first output signal for controlling the center frequency of a comb filter circuit in said player and a second output for controlling the position of a tangential velocity correction transducer coupled to said pick-up transducer and wherein said circuit means includes means responsive to said squelch signal for placing said first output signal at a level to adjust the center frequency of said comb filter to a predetermined value and for placing said second output at a level corresponding to a zero velocity error position of said tangential velocity correction transducer.

9. A squelch circuit for use in a video disc player of the kind including audio and video circuits, a video signal correction servo system and a defect masking circuit of the delayed recirculating video type, said squelch circuit comprising:

a logic circuit responsive to a squelch input signal for muting said audio and video circuits, for preconditioning said video signal correction servo to the center of its control range and for inhibiting recirculation of delayed video signals in said defect masking circuit; and a squelch memory circuit, set by the simultaneous occurrence of said squelch signal and a loss-of-carrier signal derived from a video detector in said player for maintaining said muting, preconditioning and inhibiting functions, said memory circuit being reset by subsequent termination of said loss-of-carrier signal.

10. A squelch circuit for use in a video disc player of the kind including a video signal processing circuit and a video signal correction servo responsive to said processing circuit for producing video signal error correction signals over a given control range, said squelch circuit comprising:

player control means responsive in a first operating mode for producing a squelch signal and responsive in a second operating mode for terminating said squelch signal;

loss-of-carrier detector means in said video signal processing circuit for producing a loss-of-carrier output signal in response to the absence of an FM carrier input signal and terminating said loss-of-carrier output signal in response to the presence of said FM carrier input signal;

a squelch memory circuit having first and second states;

means for placing said memory circuit in said first state in response to the simultaneous occurrence of said squelch input signal and said loss-of-carrier input signal and for placing said memory circuit in said second state in response to the termination of said loss-of-carrier signal;

means responsive to said squelch signal for preconditioning said video signal correction servo system to the center of its control range, and responsive to the first state of said squelch memory circuit for maintaining said video signal correction servo system in its preconditioned state.

11. In a video disc player the apparatus comprising:

a video FM detector for producing a video signal;

a defect masking circuit operable in a first mode for coupling said detected video signal to an output terminal thereof and in a second mode for supplying a substituted signal to said output terminal thereof;

a phase-lock loop servo system having a phase comparator for comparing a component of said video signal with an output of a reference oscillator to produce an error voltage, a sample and hold circuit for storing said error voltage on a holding capacitor and means responsive to said error voltage for feeding back at least one correction signal to a point in said video disc player in a sense to minimize the error voltage on said capacitor;

means for producing a squelch signal;

means responsive to said squelch signal for preventing application of said video signal to said defect masking circuit and substituting therefore a non-video signal; and means responsive to said squelch signal for clamping said holding capacitor to a predetermined reference voltage, said reference voltage being of such a value as to place said servo system in the center of its control range.

* * * * *